United States Patent [19]

Livingston

[11] 3,943,095

[45] Mar. 9, 1976

[54] ACID DYEABLE YARN FROM POLYAMIDE HAVING N,N'-DI (3-AMINOPROPYL)PIPERAZINE MOIETY UNITS

[75] Inventor: Richard Donnan Livingston, Seaford, Del.

[73] Assignee: E. I. Du Pont de Nemours and Company, Wilmington, Del.

[22] Filed: Sept. 26, 1974

[21] Appl. No.: 509,734

[52] U.S. Cl. ... 260/45.7 P; 57/140 R; 260/45.75 R; 260/78 R; 260/78 S; 260/78 SC
[51] Int. Cl.² .................... C08K 5/50; C08G 69/26
[58] Field of Search ............ 260/78 R, 78 S, 45.7 P, 260/78 SC; 57/140 R

[56] References Cited
UNITED STATES PATENTS

| | | | |
|---|---|---|---|
| 2,904,536 | 9/1959 | Reith................................ | 260/78 R |
| 2,989,798 | 7/1961 | Bannerman........................ | 260/78 R |
| 3,235,534 | 2/1966 | Brinkman et al. ................. | 260/78 R |
| 3,300,448 | 1/1967 | Gauthier et al..................... | 260/78 R |
| 3,511,815 | 5/1970 | Sayin................................. | 260/78 R |

*Primary Examiner*—Harold D. Anderson

[57] ABSTRACT

Yarns of good color characterized by a high capability of being deeply dyed with acid dyes are spun from copolyamides having a relative viscosity of 35–75, an amine end concentration of 35–80 gram equivalents per $10^6$ grams of polymer and a defined content of units formed in part from N,N'-di(3-aminopropyl)piperazine and which have been produced with the introduction of a defined content of a specified organic phosphorous compound prior to extrusion of the polymer.

4 Claims, No Drawings

ACID DYEABLE YARN FROM POLYAMIDE HAVING N,N'-DI (3-AMINOPROPYL)PIPERAZINE MOIETY UNITS

BACKGROUND OF THE INVENTION

This invention relates to polyamides having improved dyeability with acid dyes and more particularly to highly-dyeable, stabilized copolyamides.

It is well known that polyamides prepared using hexamethylene diammonium adipate can be polymerized to high molecular weight and that they can be dyed with acid dyes, but it has been found that it is difficult to obtain very deep shades. Consequently, there has been a continuous search for deep-dyeing polyamide compositions. British Pat. No. 1,077,992 discloses that N,N'-di(3-aminopropyl)-piperazine can be used to improve polyamide dyeability. In U.S. Pat. No. 3,078,248, it is disclosed that the frequency of spinning drips can be reduced in the production of polyamide fibers having improved dyeability from high amine ends by the use of phosphorous compounds such as phenylphosphinates. In the preparation of high relative viscosity polyamides, high levels of amine ends aggravate the problem of gel formation.

SUMMARY OF THE INVENTION

In accordance with the present invention there is provided a yarn of a copolyamide having a relative viscosity of from about 35 to 75 and a primary amine end concentration of from about 35 to 80 gram equivalents per $10^6$ grams of copolyamide, said copolyamide consisting essentially of the following repeating units:

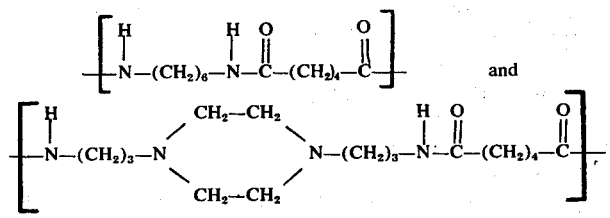

and the units containing the piperazine ring constituting from about 0.3 to 3.5%, preferably from about 1 to 2%, of the total number of repeating units, and having been produced with the introduction of from about 0.05 to 0.5% by weight, based on polymer weight, of a member of the group consisting of phenylphosphinic acid, sodium-, potassium- or hexamethylene diammonium-phenylphosphinate, prior to extrusion of the polymer. These copolyamides are characterized by good processability, good color and a high capability of being deeply dyed with acid dyes.

The hexamethylene adipate units of the copolyamide are formed from conventional nylon 6,6 precursors such as hexamethylene diammonium adipate. The copolyamide units containing the piperazine ring are formed from N,N'-di(3-aminopropyl)piperazine (hereinafter 3-Pip-3) and diacid under polyamide-forming conditions. When there are less than about 0.3 percent of these units in the copolyamide the increased dyeability is not significant, and at concentrations exceeding about 3.5 percent, at the amine end concentration required by the invention, an increase in dyeability is achieved concomitant with a deterioration of processability and fiber properties.

The copolyamides of the yarn of this invention have a primary amine end concentration of from about 35 to about 80 gram equivalents per $10^6$ grams of polymer. With less than about 35 gram equivalents per $10^6$ grams of polymer, the yarns do not have acceptable deep dyeability. The upper level is limited by the difficulties experienced in processing. At the lower levels of primary amine end concentrations, the upper levels of the piperazine ring containing units are employed to achieve the deep dyeability.

The primary amine end concentration of the copolyamide compositions is obtained by the use of an excess of a diamine beyond that required by the stoichiometry for a balanced polymer. If desired, a portion of the excess diamine used can be added as hexamethylene diammonium phenylphosphinate. The amount used will depend upon the amount of the 3-Pip-3 used, the amine end concentration desired and the relative viscosity desired, and is readily determined by calculation when the values of these three variables have been selected.

Small amounts of other amide units, other than defined above, e.g., ω-aminocaproamide units may be present in the copolyamide.

The organic phosphorous compound to be added is selected from phenylphosphinic acid or one of its salts such as the sodium-, potassium- or hexamethylene diammonium phenylphosphinate. The amount of the organic phosphorous compound to be added should be from about 0.05 to about 0.5 percent, preferably from about 0.10 to about 0.35 percent, by weight, based on polymer weight. The organic phosphorous compounds may be added to the polymer precursors, added during polymerization or added to the polymer itself prior to extrusion or spinning into filaments.

The utility of many polyamide yarns is dependent entirely or at least in part, on their great strength. The strength of the yarns is related to the molecular weight of the polymer which, for convenience, is indicated herein by reference to its relative viscosity. The deep-dyeing yarns of the present invention have a relative viscosity of from about 35 to 75. Because of the lower concentration of amine ends that are needed to obtain a relatively deep dyeable product, high viscosity levels are achieved much more readily than otherwise would be the case.

The expression "relative viscosity" as employed herein signifies the ratio of the flow time in a viscometer of a polymer solution relative to the flow time of the solvent by itself measured in the same units at 25°C. The relative viscosity is determined using an 8.4 weight percent solution of the polyamide dissolved in 90/10 weight by weight, formic acid/water solution.

The method of measuring the primary amine ends and tertiary amine groups is given in G. B. Taylor and J. E. Waltz "Anal. Chem.," Vol. 19, page 448, (1947).

A deep dyeable polyamide is one which will produce a dyeability value of at least about 20. The dyeability value of the copolyamide is expressed as the number of equivalents per $10^6$ grams of polymer of C.I. Acid Blue 45 (C.I. 63010) absorbed by copolyamide filaments immersed in a dye bath for 2 hours. The bath has a pH of 6.7, a temperature of 80°C., contains 2% of dye based on the weight of the fiber. A bath to fabric weight ratio of 20:1 is used. The number of equivalents absorbed is determined by placing a 2-gram sample in 400 milliliters of dye bath, rinsing the sample into the dye bath after dyeing and diluting the dye bath to 500 milliliters. The amount of dye in the bath is measured colorimetrically before and after dyeing and the difference used to calculate the number of equivalents absorbed by the copolyamide.

In the examples which follow, all percentages are by weight based on the weight of the solution or the polymer as the case may be unless indicated otherwise. The repeat unit containing the piperazine ring constitutes in Example II — 3.40%, in Example III — 1.18%, in Example IV — 1.18%, in Example V — 0.68%, in Example VI — 3.40% and in Example VII — 1.6%, each based on the total number of repeating units in the copolyamide. The manganous hypophosphite when used in the examples is used as an ultraviolet screener for the titanium dioxide. The examples are intended to be illustrative of the invention and not restrictive as to its scope.

EXAMPLE I

This example is a control wherein a high level of primary amine ends are present to provide deep acid dyeability.

A stainless steel evaporator is purged of air, filled with nitrogen and charged with 2735 kilograms of an aqueous solution containing 50% of hexamethylene diammonium adipate and 0.47 kilograms of an aqueous solution containing 10% of manganous hypophosphite. The solution is concentrated until the water content is 18.5%. It is transferred to a purged stainless steel autoclave. At the beginning of the autoclave cycle, 7.5 kilograms of excess hexamethylene diamine and 3.08 kilograms of phenylphosphinic acid (0.26%, based on polymer weight) are added to the autoclave. The autoclave is heated to a temperature of 195°C. at a pressure of 17.6 kilograms per square centimeter. Then an aqueous slurry containing 20% $TiO_2$ is added (0.15% $TiO_2$ based on weight of polymer).

Heating is continued and at 242°C. the vessel pressure is dissipated in a controlled manner from 17.6 to 0 kilograms per square centimeter. After a holding period, the polymer is extruded in the form of a ribbon upon a casting sheel, quenched and cut to flake suitable for remelting.

The poly(hexamethylene adipamide) flake is conditioned in a hot, inert gas atmosphere to remove moisture and then is remelted in a screw melter. The molten polymer is conveyed to a spinning position and extruded through the orifices in a spinneret to produce filaments which are spun and drawn according to conventional techniques. The drawn yarn has a relative viscosity of 69.4, 106.2 of gram equivalents of primary amine ends per $10^6$ grams of polymer and a dyeability value of about 40. Spinning performance is very poor (primarily spinning drips).

EXAMPLE II

The polymer manufacturing process described in Example I is repeated except that 19.55 kilograms of adipic acid, 35.43 kilograms of 3-Pip-3, and 1.68 kilograms of phenylphosphinic acid (0.14% based on polymer weight) are added at the beginning of the autoclave cycle. The resulting yarn has a relative viscosity of 71, 64 gram equivalents of primary amine ends per $10^6$ grams of polymer of the yarn and a dyeability value of 37. Compared to Example I, essentially the same dye depth is obtained even though primary amine ends are reduced substantially, the spinning performance is improved to a good level and polymer color remains good.

EXAMPLE III

This example is a control wherein no phenyl phosphinic acid is used with the 3-Pip-3.

The polymer manufacturing process described in Example I is repeated except that 5.62 kilograms of adipic acid and 12.29 kilograms of N,N'-di(3-aminopropyl)-piperazine are added at the beginning of the autoclave cycle. The resulting yarn has a relative viscosity of 77, 45 gram equivalents of primary amine ends per $10^6$ grams of polymer and a dyeability value of about 15. Spinning performance is acceptable, but the yarn is degraded as evidenced by poor yarn color and physical properties.

EXAMPLE IV

The polymer manufacturing process described in Example I is repeated except that 2.22 kilograms of adipic acid, 12.29 kilograms of 3-Pip-3, and 1.7 kilograms of phenylphosphinic acid (0.14% based on polymer weight) are added at the beginning of the autoclave cycle. The resulting yarn has a relative viscosity of 71, 56 gram equivalents of primary amine ends per $10^6$ grams of polymer, and a dyeability value of 22. The spinning performance is acceptable and the yarn is not degraded as evidenced by its white color and acceptable physical properties.

EXAMPLE V

The polymer manufacturing process described in Example I is repeated except that 1.5 kilograms of hexamethylene diamine, 7.1 kilograms of N,N'-di(3-aminopropyl)-piperazine and 1.7 kilograms of phenylphosphinic acid (0.14% based on polymer weight) are added at the beginning of the autoclave cycle. The resulting yarn has a relative viscosity of 71, 57 gram equivalents of primary amine ends per $10^6$ grams of polymer, and a dyeability value of 21. Spinning performance and yarn properties are satisfactory.

EXAMPLE VI

The polymer manufacturing process described in Example I is repeated except that 22.8 kilograms of adipic acid, 35.5 kilograms of N,N'-di(3-aminopropyl)-piperazine and 1.7 kilograms of phenylphosphinic acid (0.14% based on polymer weight) are added at the beginning of the autoclave cycle. The resulting yarn has a relative viscosity of 71, 48 gram equivalents of primary amine ends per $10^6$ grams of polymer and a dyeability value of 25. Spinning performance is superior and yarn physical properties are satisfactory.

EXAMPLE VII

A 50% solution of the salt of equimolar quantities of hexamethylene diamine and adipic acid is pumped into a weigh tank, where the amount equivalent to 1202 kilograms of nylon polymer is charged to an evaporator. A mixture containing 100 milliliters of antifoam, 3.61 kilograms of phenylphosphinic acid (0.3% based on polymer weight), 0.658 kilogram of hexamethylene diamine, 0.361 kilogram of manganous hypophosphite and 1.47 kilograms of acetic acid (viscosity stabilizer) with a suitable amount of water is then charged to the evaporator. The solution is evaporated to a vapor temperature of 139°C. and a pressure of about 1.9 kilograms per square centimeter. The resulting salt concentrate is introduced under a pressure of about 10.5 kilograms per square centimeter into a steel autoclave and heat is applied to increase the pressure to about 17.9 kilograms per square centimeter. During the heating step 17.69 kilograms of 3-Pip-3, 8.62 kilograms of adipic acid and 300 milliliters of antifoam are added to the autoclave. Heating is continued until a temperature of 246°C. is reached and then the pressure is reduced and the autoclave is held at atmospheric steam pressure for 16 minutes. The resulting copolyamide is extruded and quenched in the form of strands and subsequently cut into flake. The polymer is found to have 63 gram equivalents of primary amine ends/$10^6$ gram polymer, and a relative viscosity of 38. The flake is melted in a conventional grid melter and spun into filaments which are drawn on a drawtwister. The yarn is deep acid-dyeable.

What is claimed is:

1. A yarn with high capability of being deeply dyed with acid dyes, spun from composition consisting essentially of a copolyamide having a relative viscosity of from about 35–75 as determined using an 8.4 weight percent solution of the polyamide dissolved in a 90/10 weight by weight formic acid/water solution at 25°C., and a primary amine end concentration of from 35–80 gram equivalents per $10^6$ grams of copolyamide, said copolyamide, consisting essentially of the following repeating units:

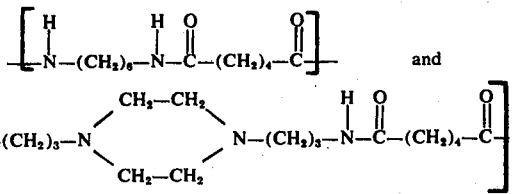

the units containing the piperazine ring constituting from about 0.3 to 3.5% of the total number of repeating units, said copolyamide having been produced with the introduction of from about 0.05 to 0.5% by weight based on polymer weight, an organic phosphorous compound selected from the group consisting of phenylphosphinic acid, sodium-, potassium- or hexamethylenediammonium phenylphosphinate prior to extrusion of the polymer.

2. The yarn of claim 1 wherein the organic phosphorous compound introduced is phenylphosphinic acid.

3. The yarn of claim 1 wherein the amount of the organic phosphorous compound introduced is from about 0.10 to about 0.35% by weight based on polymer weight.

4. The yarn of claim 1 wherein the units containing the piperazine ring constitute from about 1–2% of the total number of repeating units in the copolyamide.

* * * * *